(12) United States Patent
Gordon et al.

(10) Patent No.: US 7,713,183 B2
(45) Date of Patent: May 11, 2010

(54) METHOD AND APPARATUS FOR STORING ROBOTIC TOOLING FOR VEHICLE BODY SHEET METAL ROBOTIC ASSEMBLY

(75) Inventors: Daniel E. Gordon, Macomb, MI (US); John R. Heal, Harrison Township, MI (US)

(73) Assignee: Utica Enterprises, Inc., Shelby Township, Macomb County, MI (US)

( * ) Notice: Subject to any disclaimer, the term of this patent is extended or adjusted under 35 U.S.C. 154(b) by 991 days.

(21) Appl. No.: 11/429,861

(22) Filed: May 8, 2006

(65) Prior Publication Data

US 2007/0258797 A1 Nov. 8, 2007

(51) Int. Cl.
*B23Q 3/155* (2006.01)

(52) U.S. Cl. ............................ 483/67; 483/16; 483/63; 483/59; 483/2; 483/901

(58) Field of Classification Search .................. 483/16, 483/67, 66, 63, 59, 58, 14–15, 4, 901, 2; 211/1.52, 1.53, 1.55, 70.6
See application file for complete search history.

(56) References Cited

U.S. PATENT DOCUMENTS

| | | | | |
|---|---|---|---|---|
| 2,318,081 A | * | 5/1943 | Kerry ........................... | 483/63 |
| 3,273,235 A | * | 9/1966 | Dziedzic et al. ............... | 483/48 |
| 3,966,052 A | * | 6/1976 | Knaus ........................... | 483/67 |
| 4,344,221 A | * | 8/1982 | Pagani ........................... | 483/8 |
| 4,359,815 A | | 11/1982 | Toyoda | |
| 4,394,908 A | * | 7/1983 | Pinchemaille ................. | 483/62 |
| 4,587,716 A | | 5/1986 | Bytow | |
| 4,679,297 A | | 7/1987 | Hansen, Jr. et al. | |
| 4,723,353 A | | 2/1988 | Monforte | |
| 4,845,835 A | * | 7/1989 | Schneider ..................... | 483/49 |
| 4,893,398 A | | 1/1990 | Zimmer | |
| 5,281,194 A | | 1/1994 | Schneider | |
| 5,304,110 A | * | 4/1994 | Obrist .......................... | 483/14 |
| 5,364,329 A | * | 11/1994 | Line ............................. | 483/56 |
| 5,672,145 A | | 9/1997 | Pollington et al. | |
| 6,228,006 B1 | * | 5/2001 | Horn et al. .................... | 483/55 |
| 2004/0167001 A1 | | 8/2004 | Hagihara et al. | |

FOREIGN PATENT DOCUMENTS

| | | | |
|---|---|---|---|
| EP | 1260306 A1 | * | 11/2002 |
| EP | 1375059 A2 | * | 1/2004 |
| JP | 54-064780 A | * | 5/1979 |
| JP | 64-045541 A | * | 2/1989 |

* cited by examiner

*Primary Examiner*—Erica E Cadugan
(74) *Attorney, Agent, or Firm*—Brooks Kushman P.C.

(57) ABSTRACT

Apparatus (12) for storing robotic tooling for vehicle body sheet metal robotic assembly operates a robot to transfer robotic tooling between an assembly station and a rotary storage rack (56) of a storage rack assembly (28). The storage rack (56) has vertically spaced storage locations and is rotated about a vertical axis to provide circumferentially spaced storage locations.

7 Claims, 6 Drawing Sheets

METHOD AND APPARATUS FOR STORING ROBOTIC TOOLING FOR VEHICLE BODY SHEET METAL ROBOTIC ASSEMBLY

BACKGROUND OF THE INVENTION

1. Field of the Invention

This invention relates to a method and apparatus for storing robotic tooling used for vehicle body sheet metal robotic assembly.

2. Background Art

Robots are conventionally used in vehicle body sheet metal assembly stations at which formed sheet metal parts are processed to provide assembly to each other. The processing is performed by the robots utilizing robotic tooling much of which involves end effectors that are mounted on the end of a robot arm to provide the required processing. More specifically, such robotic tooling conventionally includes welding heads which may be either of the laser or electric resistance type, adhesive applicators, sealant providers, material handling tooling, and part position tooling, etc. Often, any particular robot can perform more than one function such that the tooling utilized at the end of its robot arm has to be switched, which results in the need for storage and retrieval. In the past, such storage and retrieval has required considerable factory floor space, which is increased by flexible manufacturing when different model vehicle bodies are assembled at the same assembly station and thus necessitate more robotic tool switching.

Prior art patents noted by an investigation conducted in accordance with the present invention include U.S. Pat. No. 4,359,815 Toyoda; U.S. Pat. No. 4,587,716 Bytow; U.S. Pat. No. 4,723,353 Monforte; U.S. Pat. No. 5,281,194 Schneider; and U.S. Pat. No. 5,672,145 Pollington et al.; and United States Published Application 2004/0167001 Hagihara et al.

SUMMARY OF THE INVENTION

An object of the present invention is to provide improved robotic tooling storage apparatus.

In carrying out the above object, the robot tooling storage apparatus of the invention includes a storage rack assembly including a base and a rotary storage rack mounted by the base for rotation about a vertical axis. The rotary storage rack has circumferentially spaced storage locations about the vertical axis for receiving robotic tooling at both radial inner and outer storage locations from a vehicle body sheet metal robotic assembly station at which formed sheet metal parts are processed for robotic assembly to each other. Each tooling storage location includes an upwardly facing hook and a positioning stop, for positioning an associated robotic tooling mounted by the respective hook, located below the hook. A rotary actuator rotates the rotary storage rack to store and allow retrieval of robotic tooling at different locations on the storage rack.

The positioning stops for the radial outer tooling storage locations extend farther radially outward than the positioning stops for the radial inner robotic tooling storage locations. The rotary storage rack has vertically spaced robotic tooling storage locations as well as the circumferentially spaced robotic tooling storage locations. Furthermore, the rotary storage rack has radial outer and inner robotic tooling storage locations. More specifically, the rotary storage rack has vertically and circumferentially spaced robotic tooling storage locations each of which has radial outer and inner storage capability. The storage rack assembly has rollers supporting the storage rack for its rotation on the base about the vertical axis.

A control of the robotic tooling storage apparatus operates the rotary actuator of the storage rack assembly in coordination with a robot of the assembly station.

The objects, features, and advantages of the present invention are readily apparent from the following detailed description of the preferred embodiment when taken in connection with the accompanying drawings.

DETAILED DESCRIPTION OF THE PREFERRED EMBODIMENT

Figure 1:
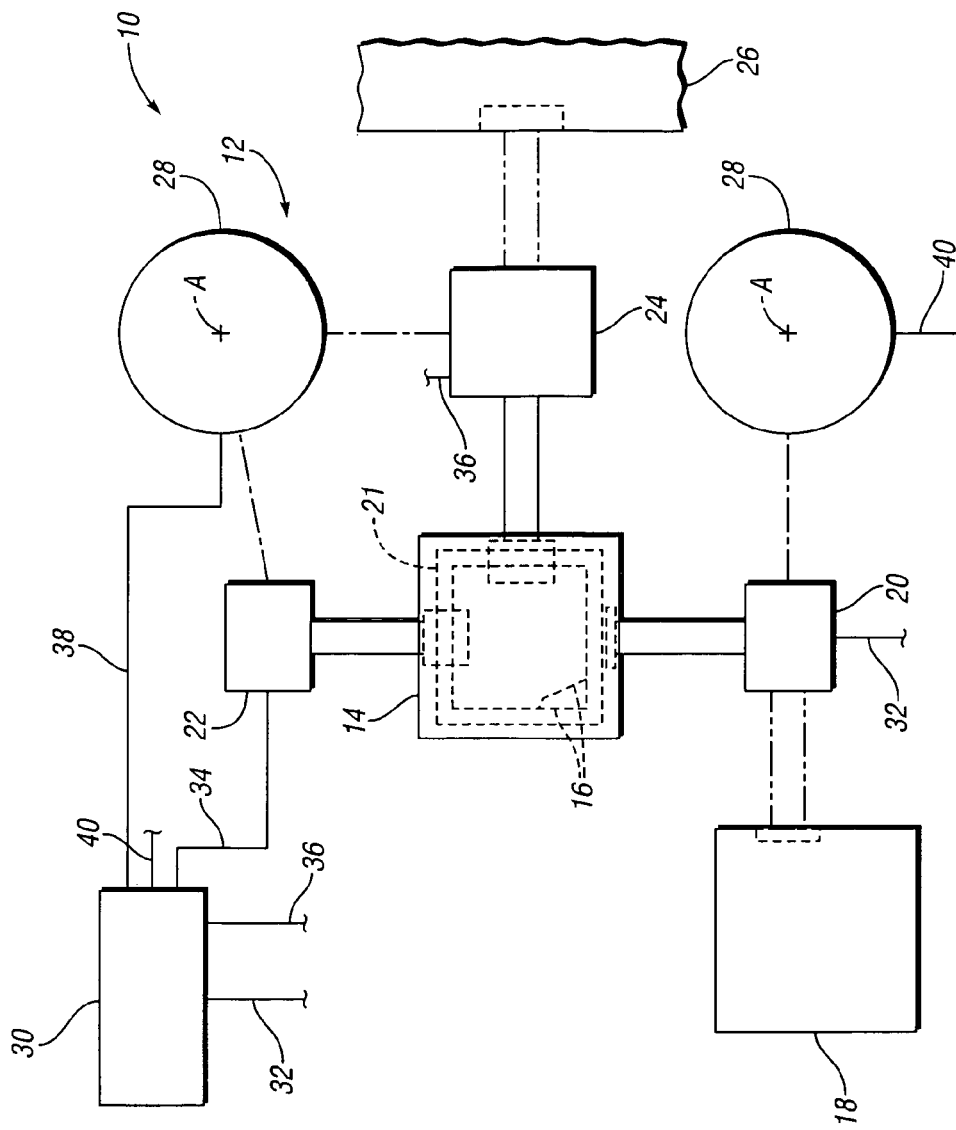
FIG. 1 is a schematic view of a vehicle body sheet metal robotic assembly station that performs robotic tooling storage in accordance with the invention and includes storage apparatus for storing and permitting retrieval of robotic tooling by an associated robot in accordance with the invention.

With reference to FIG. 1 of the drawings, a vehicle body sheet metal robotic assembly station constructed in accordance with the invention is generally indicated by 10. As is hereinafter more fully described, the robotic assembly station 10 includes apparatus 12 for performing robotic tooling storage and retrieval in accordance with the invention.

The assembly station 10 includes an assembly table 14 at which formed sheet metal parts 16 (see also FIGS. 7 and 8) are processed for assembly. A supply 18 of the sheet metal parts permits a material handling robot 20 to move parts for assembly to the assembly table 14 by 90 degree movement of its arm from the phantom line indicated position to the solid line indicated position. A processing robot 22 performs assembly processing of the formed sheet metal parts 16, as is hereinafter more fully described, with the parts positioned with respect to each other by part positioning tooling 21. Another material handling robot 24 is moved 180 degrees from the solid line position shown to the phantom line position to deliver assembled parts to a delivery location 26 for further processing.

With continuing reference to FIG. 1, the storage rack assembly apparatus 12 of the invention includes a pair of rotary storage rack assemblies 28 that are operable to permit robotic tooling storage and retrieval. A control 30 has control connections 32, 34 and 36 for operating the robots 20, 22 and 24 and also has control connections 38 and 40 to the pair of storage rack assemblies 28 to provide coordinated operation thereof with the robots so the robot arms can be positioned to store robotic tooling on the rack assemblies and retrieve the robotic tooling as needed.

Figure 7:
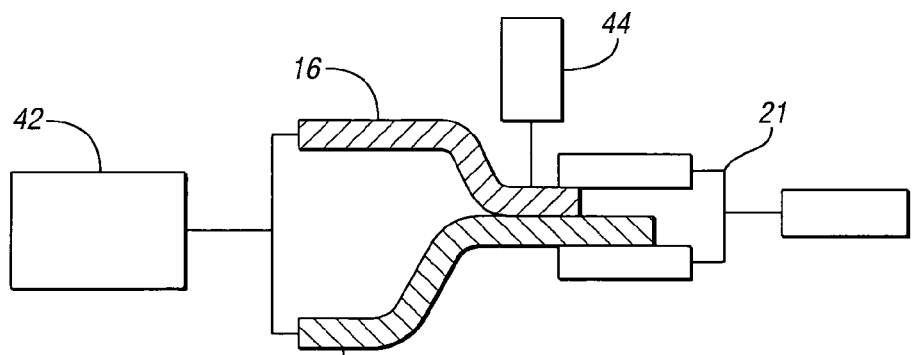
FIGS. 7 and 8 are schematic views illustrating robotic tooling used to provide formed sheet metal assembly processing by robotic tooling that is stored by the method and apparatus of the invention.
Figure 8:
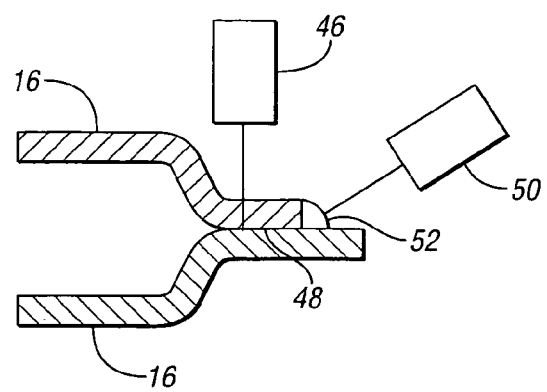

With reference to FIGS. 7 and 8, the formed sheet metal parts 16 are processed for assembly by robotic tooling including: the previously described part positioning tooling 21, material handling tooling 42, a welding head 44 which may be of the laser or electric resistance type, adhesive applicators 46 for providing an adhesive 48 between parts in connection with their assembly to each other, and sealant providers 50 for providing a sealant 52. Likewise, other robotic tooling embodied by other robot end effectors and other tooling can also be stored by the storage rack assemblies 28 of the assembly station.

Figure 2:
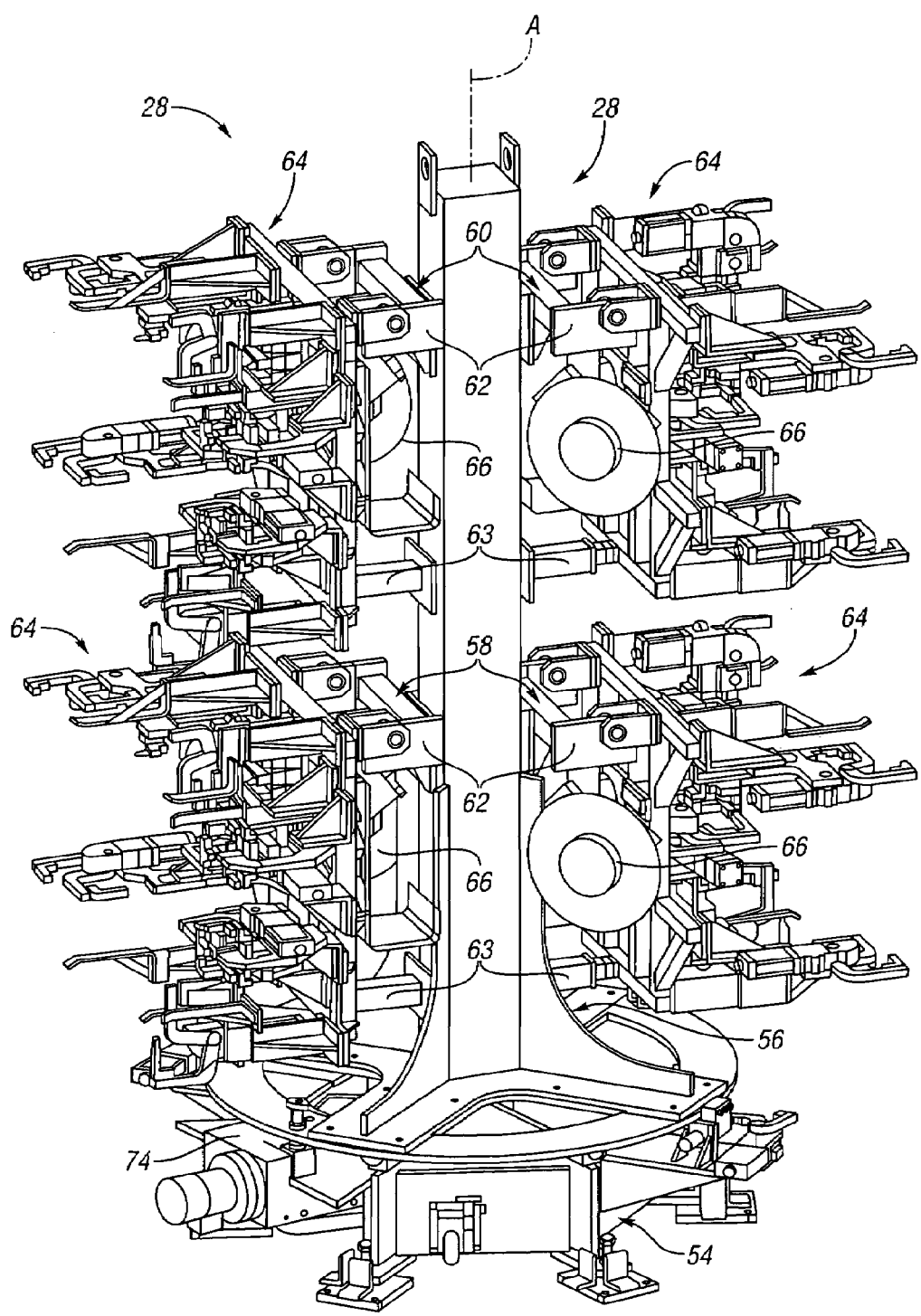
FIG. 2 is a perspective view illustrating a storage rack assembly including a base and a rotary storage rack mounted by the base and having spaced storage locations for storing robotic tooling.

As illustrated in FIG. 2, each storage rack assembly 28 includes a base generally indicated by 54 and a storage rack 56 mounted on the base for rotation about a vertical central axis A. The storage rack 56 includes vertically spaced storage locations 58 and 60 at lower and upper positions and also has circumferentially spaced storage locations 58 and 60 which are shown at each of the lower and upper positions in a diametrically opposite relationship with respect to central axis A, although it should be appreciated that a different number of circumferentially spaced storage locations can also be utilized and appropriately angularly positioned with respect to each other about the central axis A. Each of the storage locations as shown includes a hanger 62 provided as an upwardly facing hook and a positioning stop 63 for positioning an associated robotic tooling device, which is illustrated as a robotic material processing end effector 64, which includes one component 66 of a mount coupling for mounting the end effector on an associated robot arm.

Figure 3:
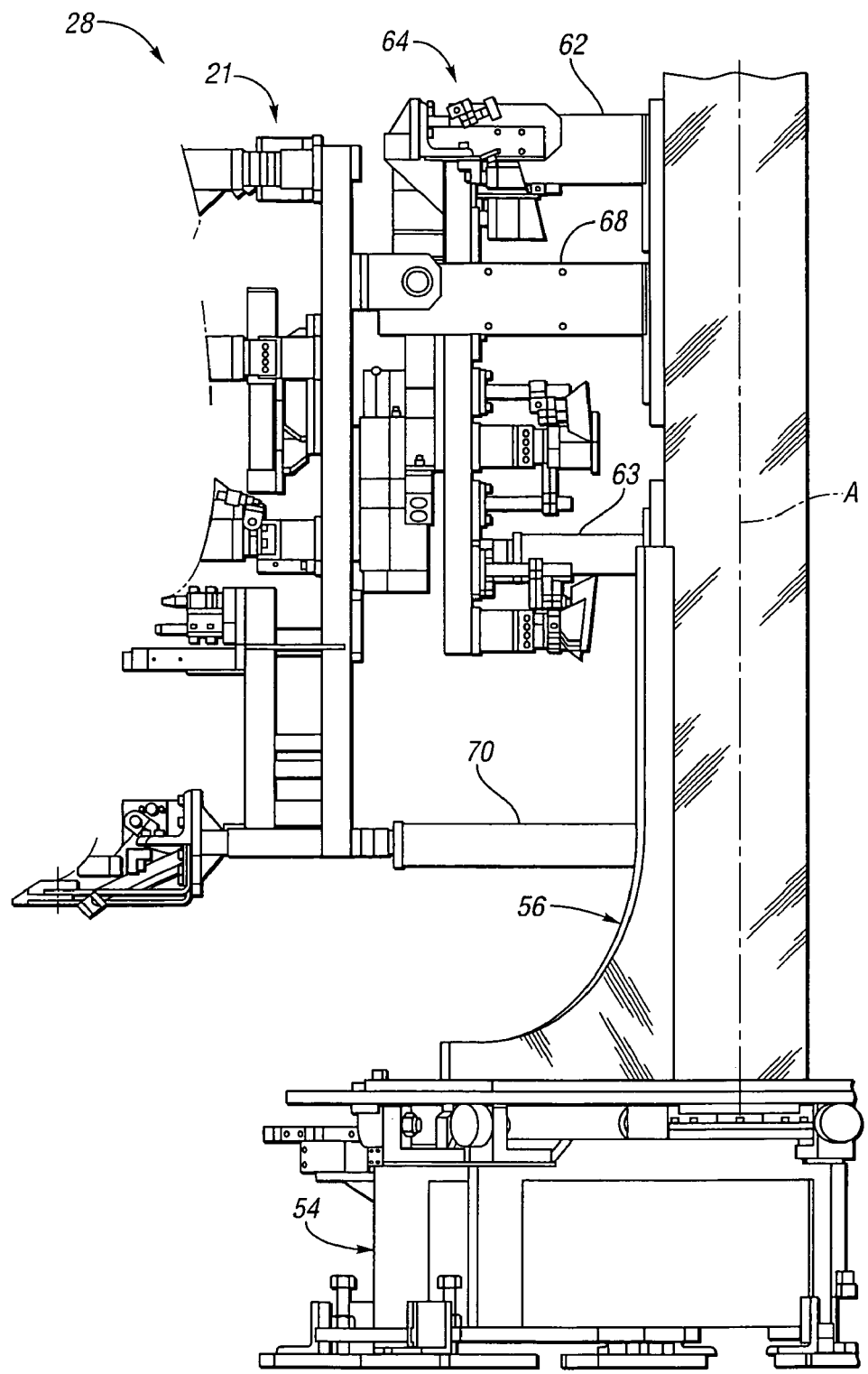
FIG. 3 is a partial view of the storage rack assembly illustrating the manner in which robotic tooling can be stored at radial inner and outer locations.
Figure 5:
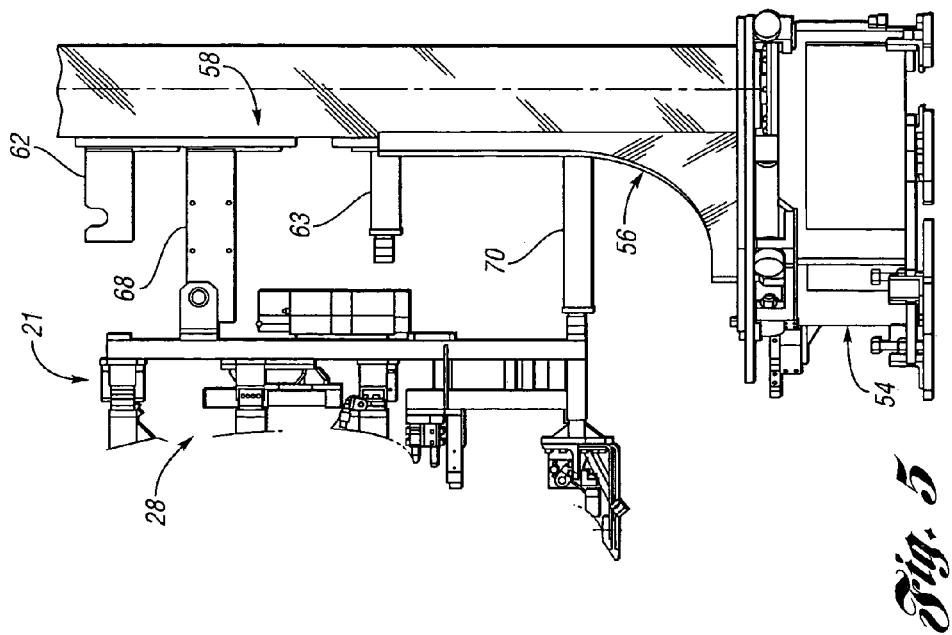
FIG. 5 is a partial view of the rotary storage rack assembly shown in FIG. 2 but showing robotic tooling stored only at a radial outer location.
Figure 4:
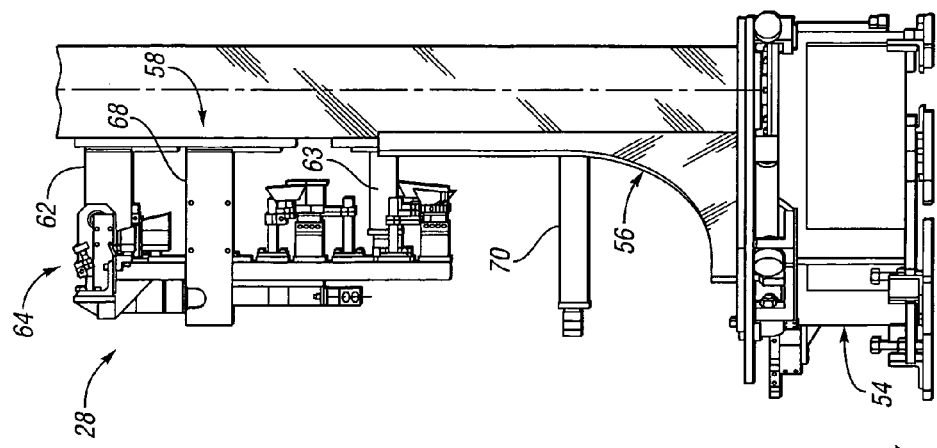
FIG. 4 is a view similar to FIG. 3 but showing the robotic tooling stored only at a radial inner location.

As shown in the partial views of FIGS. 3, 4 and 5, the storage rack 56 has the capability to provide robotic tooling storage at both radial inner and outer locations. In FIG. 4, the end effector 64 is shown mounted by the hangers 62 and positioning stop 63 at a radial inner location with an adjacent radial outer location vacant. In FIG. 5, the part positioning robotic tooling 21 is shown mounted by additional upwardly facing hook hangers 68 and a positioning stop 70 at the radial outer locations with the radial inner location vacant. The positioning stops 70 of the radial outer tooling storage locations extend radially outward farther than the positioning stops 63 of the radial inner tooling storage locations. In FIG. 3, the storage rack 56 has the end effector 64 mounted at the radial inner location and the part positioning tooling mounted at the radial outer location. Each of the vertically and circumferentially spaced mounting locations can also have both the radial outer and inner robotic tooling storage capability.

Figure 6:
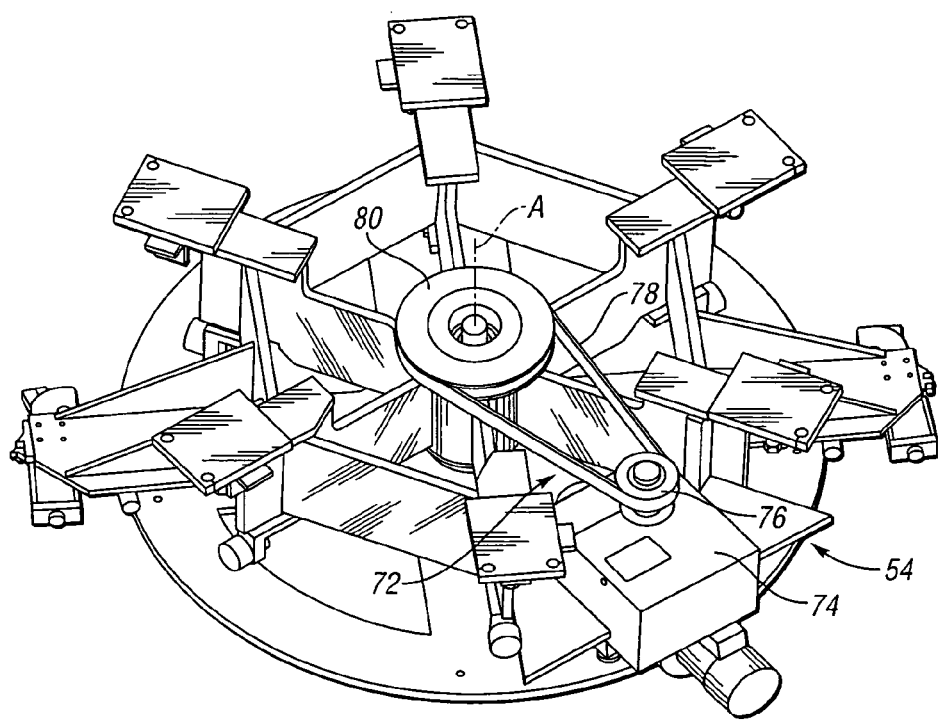
FIG. 6 is a bottom perspective view of the base of the storage rack assembly and illustrates an electric motor actuator that provides storage rack rotation.

With reference to FIG. 6, a rotary actuator 72 as disclosed includes an electric control motor 74 mounted on the base 54 and having an output pulley 76 that receives a belt 78 also received by a pulley 80 fixed to the rotary storage rack previously described. This rotary actuator 72 rotates the storage rack to provide proper positioning for receiving and permitting retrieval of associated robotic tooling. The rotation of the storage rack does not have to be greater than 360 degrees, since rotation in either direction less than 360 degrees can provide the proper angular positioning for alignment with an associated robot that is to store or retrieve any particular robotic tooling unit. This rotation is under the control of the system control 30, shown in FIG. 1, through its connections to the robots and the rotary storage rack assemblies 28.

Figure 9:
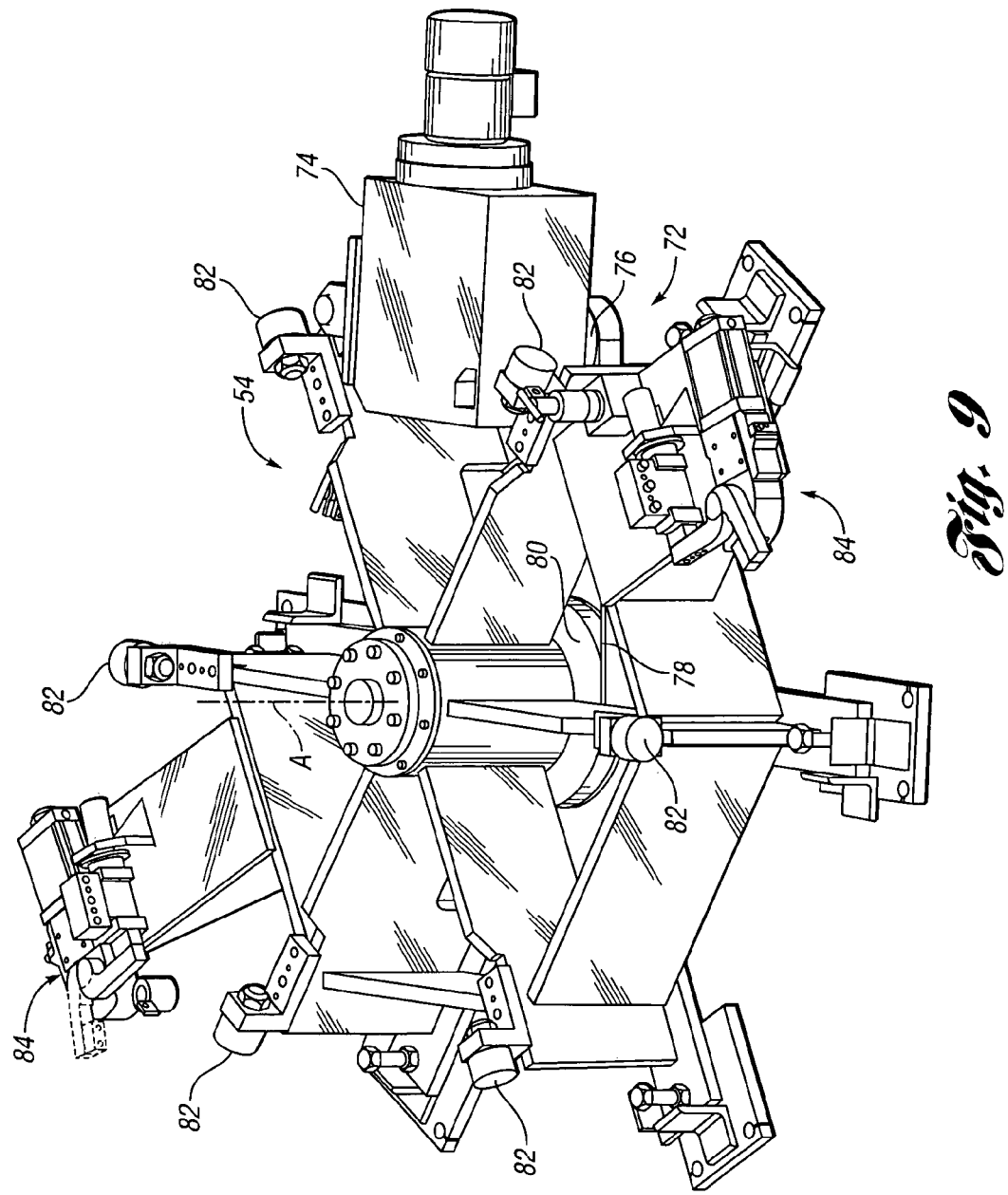
FIG. 9 is a top perspective view of the base of the storage rack assembly, but with the storage rack removed, and illustrates rollers that facilitate storage rack rotation.

With reference to FIG. 9, rollers 82 support the storage rack, which is removed in this view for purposes of illustration, so as to facilitate its rotation about the central axis A under the operation of the rotary actuator 72. These rollers 82 as illustrated are shown mounted on the base and an unshown trackway on the storage rack contacts the rollers to provide the rotational support. Proximity switches 84 are utilized to provide the storage rack rotational positioning as it moves to the different positions required for the storage and retrieval of robotic tooling as described above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Robotic tooling storage apparatus comprising:
    a storage rack assembly including a base and a rotary storage rack mounted by the base for rotation about a vertical axis;
    the rotary storage rack having circumferentially spaced storage locations about the vertical axis for receiving robotic tooling at both radial inner and outer tooling storage locations from a vehicle body sheet metal robotic assembly station at which formed sheet metal parts are processed for robotic assembly to each other, each tooling storage location including an upwardly facing hook and a positioning stop, for positioning an associated robotic tooling mounted by the respective hook, located below the hook; and
    a rotary actuator for rotating the rotary storage rack to store and allow retrieval of robotic tooling at different locations on the storage rack.

2. Robotic tooling storage apparatus as in claim 1 wherein the rotary storage rack has vertically spaced robotic tooling storage locations as well as the circumferentially spaced storage locations.

3. Robotic tooling storage apparatus as in claim 1 wherein the positioning stops for the radial outer tooling storage locations extend farther radially outward than the positioning stops for the radial inner robotic tooling storage locations.

4. Robotic tooling storage apparatus as in claim 1 wherein the rotary storage rack also has vertically spaced robotic tooling storage locations as well as the circumferentially spaced storage locations.

5. Robotic tooling storage apparatus as in claim 1 wherein the base includes rollers that support the storage rack for rotation about the vertical axis.

6. Robotic tooling storage apparatus as in claim 1 further including a control for operating the rotary actuator in coordination with a robot of the assembly station.

7. Robotic tooling storage apparatus comprising:
    a storage rack assembly including a base and a rotary storage rack mounted by the base for rotation about a vertical axis;
    the rotary storage rack having vertically and circumferentially spaced storage locations for receiving robotic tooling at both radial inner and outer tooling storage locations from a vehicle body sheet metal robotic assembly station at which formed sheet metal parts are processed for robotic assembly to each other, each tooling storage location including an upwardly facing hook and a positioning stop, for positioning an associated robotic tooling mounted by the respective hook, located below the hook;
    a rotary actuator for rotating the rotary storage rack to receive and allow retrieval of robotic tooling at different locations on the storage rack; and
    a control for operating the rotary actuator in coordination with a robot of the assembly station.

* * * * *